(12) United States Patent
Burkart et al.

(10) Patent No.: US 7,278,240 B2
(45) Date of Patent: *Oct. 9, 2007

(54) SYSTEM FOR SECURING A POST (75) Inventors: Michael G. Burkart, Denver, CO (US); Jeffrey G. Herion, Watkins, CO (US)

(73) Assignee: Stallion Fence Accessories, LLC, Denver, CO (US)

( * ) Notice: Subject to any disclaimer, the term of this patent is extended or adjusted under 35 U.S.C. 154(b) by 253 days.

This patent is subject to a terminal disclaimer.

(21) Appl. No.: 10/982,024

(22) Filed: Nov. 5, 2004

(65) Prior Publication Data

US 2005/0072068 A1    Apr. 7, 2005

Related U.S. Application Data (63) Continuation of application No. 10/426,442, filed on Apr. 29, 2003, now Pat. No. 6,948,283.

(60) Provisional application No. 60/376,658, filed on Apr. 29, 2002.

(51) Int. Cl.
*E02D 5/74* (2006.01)
(52) U.S. Cl. ............... 52/155; 52/165; 248/346.01
(58) Field of Classification Search ........... 52/155, 52/165, 169.9; 248/346.01, 346.03, 188.1, 248/231.31, 523

See application file for complete search history.

(56) References Cited

U.S. PATENT DOCUMENTS 1,225,431 A    5/1917    Gelbart 1,258,460 A    3/1918    Rees (Continued)

FOREIGN PATENT DOCUMENTS

CA    2322610    4/2002

(Continued)

OTHER PUBLICATIONS

12V Lighting Solutions Solved by Sipex Featuring Sipex SP613X Family for High Current Applications; Sipex; (date unknown); 2 pp.

(Continued)

*Primary Examiner*—Carl D. Friedman
*Assistant Examiner*—Basil Katcheves
(74) *Attorney, Agent, or Firm*—Sheridan Ross P.C.

(57) ABSTRACT

A post mounting system and method that includes individually adjustable angled gripping elements which contact the interior of a hollow post so as to hold the post firmly against a retaining wall of a base member surrounding the lower end of the post. One or more shim components having a surface area substantially the same as at least the surface area of the bottom of the base member is used to adjust the vertical angularity of a post secured to the base member. The shims may be circularly shaped with a slot extending to the center thereof for shim placement about a rod upon which the base member is mounted. There is a thicker portion of such a shim opposite the slot. Alternative embodiments include additional post reinforcing structures insertable into the interior of the hollow post to provide additional support for complying with building code requirements, such as second story dwelling uses, etc.

16 Claims, 12 Drawing Sheets

U.S. PATENT DOCUMENTS

| | | |
|---|---|---|
| 2,590,929 A | 4/1952 | Bush |
| 2,930,638 A | 3/1960 | Morrissey |
| 3,222,509 A | 12/1965 | Thedford |
| 3,370,388 A | 2/1968 | Dielman |
| 3,484,827 A | 12/1969 | Hall |
| 3,506,243 A | 4/1970 | Seiler |
| 3,698,144 A | 10/1972 | Stratton |
| 3,707,276 A | 12/1972 | Francis et al. |
| 3,737,009 A | 6/1973 | Stoddard |
| 3,744,117 A | 7/1973 | Heenan et al. |
| 3,866,034 A | 2/1975 | Russo |
| 4,171,523 A | 10/1979 | Parkitny |
| 4,175,883 A | 11/1979 | Lemelson |
| D255,472 S | 6/1980 | Gabriel |
| 4,261,138 A | 4/1981 | St. George Syms |
| 4,274,044 A | 6/1981 | Barre |
| 4,286,747 A | 9/1981 | Deike |
| 4,722,514 A | 2/1988 | Pettit |
| 4,821,952 A | 4/1989 | Deciutiis |
| 4,836,127 A | 6/1989 | Willie |
| 4,869,426 A | 9/1989 | Powers et al. |
| 4,874,149 A | 10/1989 | Miceli |
| 4,875,622 A | 10/1989 | Lents |
| 4,921,200 A | 5/1990 | Moraly |
| 4,923,164 A | 5/1990 | Stenberg |
| D309,788 S | 8/1990 | Koziol |
| 4,955,534 A | 9/1990 | Raible |
| 4,999,060 A | 3/1991 | Szekely et al. |
| 5,041,952 A | 8/1991 | Janda et al. |
| 5,042,716 A | 8/1991 | Robbins |
| 5,055,984 A | 10/1991 | Hung et al. |
| 5,060,900 A | 10/1991 | Kokoruda et al. |
| 5,071,063 A | 12/1991 | Overstreet |
| 5,082,231 A | 1/1992 | Knowles |
| 5,086,267 A | 2/1992 | Janda et al. |
| 5,104,265 A | 4/1992 | Halloran, Jr. |
| D326,728 S | 6/1992 | Layne |
| 5,141,207 A | 8/1992 | Meglino et al. |
| 5,143,472 A | 9/1992 | Reed et al. |
| 5,149,149 A | 9/1992 | Wu |
| 5,167,364 A | 12/1992 | Wenning |
| 5,169,062 A | 12/1992 | Baker |
| 5,207,377 A | 5/1993 | Brecht |
| 5,221,891 A | 6/1993 | Janda et al. |
| 5,271,594 A | 12/1993 | Djelouah |
| 5,307,598 A | 5/1994 | West |
| 5,337,954 A | 8/1994 | Kobilarcik et al. |
| 5,351,883 A | 10/1994 | Pachl |
| 5,356,072 A | 10/1994 | Thomas |
| 5,361,977 A | 11/1994 | Ogrodnick, Jr. |
| 5,367,442 A | 11/1994 | Frost et al. |
| 5,386,938 A | 2/1995 | West |
| 5,400,959 A | 3/1995 | Cone |
| 5,404,682 A | 4/1995 | West |
| 5,419,536 A | 5/1995 | Bender |
| 5,427,342 A | 6/1995 | Gagnon |
| 5,437,409 A | 8/1995 | Coushaine |
| 5,445,086 A | 8/1995 | Bolduc |
| 5,453,729 A | 9/1995 | Chu |
| 5,458,428 A | 10/1995 | West |
| 5,465,535 A | 11/1995 | Skogberg |
| 5,465,902 A | 11/1995 | Hanson |
| RE35,133 E | 12/1995 | Halloran, Jr. |
| 5,480,121 A | 1/1996 | Rice et al. |
| 5,492,429 A | 2/1996 | Hodges |
| 5,524,853 A | 6/1996 | Varlaro |
| 5,573,178 A | 11/1996 | Worden |
| 5,620,136 A | 4/1997 | Erwin et al. |
| 5,630,660 A | 5/1997 | Chen |
| 5,634,733 A | 6/1997 | Sperduti |
| 5,660,376 A | 8/1997 | West |
| D383,374 S | 9/1997 | Sammann |
| 5,678,757 A | 10/1997 | Martin |
| 5,695,174 A | 12/1997 | Tsai |
| 5,697,190 A | 12/1997 | Scribner |
| 5,709,057 A | 1/1998 | Johnson, Jr. et al. |
| 5,722,205 A | 3/1998 | Gannaway |
| 5,758,857 A | 6/1998 | Gray |
| 5,779,202 A | 7/1998 | Black et al. |
| 5,782,479 A | 7/1998 | Adams et al. |
| 5,806,758 A | 9/1998 | Erwin et al. |
| 5,816,554 A | 10/1998 | McCracken |
| 5,842,685 A | 12/1998 | Purvis et al. |
| 5,853,167 A | 12/1998 | West et al. |
| D405,545 S | 2/1999 | Forbis |
| D405,546 S | 2/1999 | Forbis |
| 5,873,671 A | 2/1999 | West |
| 5,884,874 A | 3/1999 | Speece et al. |
| D409,078 S | 5/1999 | Bolt |
| 5,911,501 A | 6/1999 | Katz |
| 5,927,677 A | 7/1999 | Speece et al. |
| 5,938,184 A | 8/1999 | DeSouza |
| 5,946,871 A | 9/1999 | Kassardjian et al. |
| 5,950,498 A | 9/1999 | Gossett et al. |
| 5,967,498 A | 10/1999 | Junell |
| 5,971,267 A | 10/1999 | Beckmann |
| 5,971,365 A | 10/1999 | Pigott et al. |
| 5,988,599 A | 11/1999 | Forbis |
| 6,013,985 A | 1/2000 | Green et al. |
| 6,017,019 A | 1/2000 | Erwin |
| RE36,550 E | 2/2000 | West |
| 6,041,486 A | 3/2000 | Forbis |
| 6,050,034 A | 4/2000 | Krinner |
| 6,061,991 A | 5/2000 | Dahl |
| 6,076,807 A | 6/2000 | Spence |
| 6,102,357 A | 8/2000 | Papadatos |
| 6,109,519 A | 8/2000 | McClure |
| 6,135,623 A | 10/2000 | Lin |
| 6,149,119 A | 11/2000 | O'Connell |
| 6,161,756 A | 12/2000 | Upton |
| 6,168,129 B1 | 1/2001 | Krinner |
| 6,199,818 B1 | 3/2001 | Tsappi |
| 6,202,987 B1 | 3/2001 | Forbis |
| 6,257,532 B1 | 7/2001 | Ives |
| D446,315 S | 8/2001 | Forbis |
| 6,273,390 B1 | 8/2001 | Meyer |
| 6,298,611 B1 | 10/2001 | Oliver et al. |
| 6,308,937 B1 | 10/2001 | Pettit |
| 6,311,955 B1 | 11/2001 | McGarry et al. |
| 6,314,699 B1 | 11/2001 | West |
| 6,324,800 B1 | 12/2001 | Valentz et al. |
| D454,963 S | 3/2002 | Forbis |
| D454,964 S | 3/2002 | Forbis |
| D454,965 S | 3/2002 | Forbis |
| D455,220 S | 4/2002 | Forbis |
| D455,502 S | 4/2002 | Forbis |
| 6,406,163 B1 | 6/2002 | Yang |
| 6,425,676 B1 | 7/2002 | Lyons |
| D461,568 S | 8/2002 | Forbis |
| D464,438 S | 10/2002 | Skulsky |
| 6,460,829 B1 | 10/2002 | Forbis et al. |
| 6,467,756 B1 | 10/2002 | Elsasser |
| 6,468,072 B2 | 10/2002 | Shook |
| 6,471,192 B1 | 10/2002 | Erwin |
| 6,491,286 B1 | 12/2002 | Hadfield, Sr. et al. |
| D469,559 S | 1/2003 | Chang |
| 6,543,751 B1 | 4/2003 | Spruill |
| 6,581,335 B2 | 6/2003 | Grant |
| 6,585,398 B1 | 7/2003 | Haddad |
| 6,601,831 B2 | 8/2003 | Erwin |
| 6,619,627 B2 | 9/2003 | Salisbury et al. |
| 6,648,304 B1 | 11/2003 | Zhu |
| D484,631 S | 12/2003 | Chen |
| 6,669,163 B2 | 12/2003 | Davis, Jr. |

| | | | |
|---|---|---|---|
| 6,682,056 B1 | 1/2004 | West | |
| D487,158 S | 2/2004 | Forbis | |
| D487,160 S | 2/2004 | Forbis | |
| 6,698,726 B2 | 3/2004 | Platt | |
| 6,722,637 B2 | 4/2004 | Burkart et al. | |
| D490,543 S | 5/2004 | Forbis | |
| D494,311 S | 8/2004 | Burkart | |
| D495,086 S | 8/2004 | Burkart et al. | |
| D497,023 S | 10/2004 | Burkart et al. | |
| 6,805,335 B2 | 10/2004 | Williams | |
| 6,824,123 B2 | 11/2004 | Larsen et al. | |
| 6,874,766 B2 | 4/2005 | Curatolo | |
| 6,948,283 B2 * | 9/2005 | Burkart et al. | 52/155 |
| 6,948,704 B2 | 9/2005 | Forbis et al. | |
| 7,048,259 B2 | 5/2006 | Quaintance et al. | |
| 2001/0017150 A1 | 8/2001 | Doreste | |
| 2001/0035523 A1 | 11/2001 | Venegas, Jr. | |
| 2002/0023406 A1 | 2/2002 | Pettit et al. | |
| 2002/0072023 A1 | 6/2002 | Shook | |
| 2002/0125468 A1 | 9/2002 | Fischer | |
| 2002/0148183 A1 | 10/2002 | Grant | |
| 2002/0185640 A1 | 12/2002 | Heins | |
| 2003/0030048 A1 | 2/2003 | Quaintance et al. | |
| 2003/0038282 A1 | 2/2003 | Forbis et al. | |
| 2003/0101673 A1 | 6/2003 | West et al. | |
| 2003/0164486 A1 | 9/2003 | West | |
| 2004/0036064 A1 | 2/2004 | Takagi et al. | |
| 2004/0261243 A1 | 12/2004 | Quaintance et al. | |

FOREIGN PATENT DOCUMENTS

| | | |
|---|---|---|
| JP | 11236755 | 8/1999 |
| JP | 2002242402 | 8/2002 |
| JP | 2002322782 | 11/2002 |
| JP | 2004116145 | 4/2004 |
| WO | WO - 93/13354 | 7/1993 |

OTHER PUBLICATIONS

Front and rear view pictures of rail mounting bracket; (date unknown, but assumed to be prior art); 3 pp.
Hoover Fence Co.; Vinyl Fence & Railing Solar Lighting Post Caps; 2003; 2 pp.
Improvements Product 255593, Solar Post-Cap Light; (date unknown); 1 p.
Installation Instructions for Railing Wood Post Insert; *A Vinyl Fence & Deck Wholesaler*, (date unknown); 6pp.
Intermatic Incorporated Product Fact Sheet; Model No. LZ21811K; Mar. 3, 2003, 1 p.
Intermatic Malibu; Model LZ25030RB; (date unknown); 2 pp.
Letter from Jeffery B. Seegert of ICC Evaluation Service, Inc. Providing Proposed Revisions to the Acceptance Criteria for Deck Board Span Ratings and Guardrail Systems (Guards and Handrails), Subject AC174-0604.
Picture of a scalloped pergola end cap by Kroy Building Products, Inc.; 2000-2001.
Picture of a pergola end cap by Model Fence Technologies; date unknown.
Poly Vinyl Creations; 2001; 2 pp.
Product Information on Vinyl Railing; *Genova Publication, Genova Products, Inc.*, 7034 E. Court Street, Davison, MI 48423-0309; (www.genovaproduct.com); (date unknown); 2 pp.
Providing The Most Efficient, Space Saving Solutions For Power Conversion; *Sipex Power Management*; (date unknown); 6 pp.
The Lakeside Collection; Product Nos. 886088012 and 886089010; 2004; 2 pp.
Vinyl Railing Systems Installation Information; *Hoover Enterprises*; 1995-2001; 4 pp.
Webpage: http://www.a-fence.com; Installation Instructions for a Bracketed Railing System; *A Vinyl Fence and Deck Wholesaler*; (541) 273-2102; (date unknown); 1 p.
Webpage; http://www.a-fence.com; Installation Instructions for a 22 1/2 Degree and 45 Degree Bracket; *A Vinyl Fence and Deck Wholesaler*; (541) 273-2102; (date unknown); 2 pp.
Webpage sales add for United Steel 2×4" Fence Bracket; CornerHardware.com; 2001-2003; 2 pp.
Webpage sales add for Fence Bracket Triple Zinc; DoitBest.com; 2003; 2 pp.
Wedax Corporation; Product WD-401, Solar Decking Caps; 2003; 1 p.
Wedax Corporation: What Is The Solar Fence Cap? How Does It Work?; 2003; 1 p.
Wedax Corporation; Products WD-101-102, Solar Vinyl Fence Cap, and WD-201-202, Wedax Corporation; Products WD-301-302, Solar Ornamental Fence Caps; 2003; 1 p. MaxSolar; 2003; 2 pp.
Wedax Corporation; Products WD-301-302, Solar Ornamental Fence Caps; 2003; 1 p.
"EZ Mount"; *Sharp Innovations, Inc.*; 2003.
"Fiberon Vinyl Deck Railing System: Stair Rail Installation"; *Fiberon*; (date unknown).
"UltiMountII: Post Mount System"; *Fox Home Center, Inc.*; 2003.
"General Residential Fence Installation Instructions" *A Vinyl Fence & Deck Wholesaler*; (date unknown).
"Porch Post and Bracket Installation Instructions"; *A Vinyl Fence & Deck Wholesale*; (date unknown).
"Porch Post Tie Down Storm Kit: Installation Instructions"; *Hover Fence Companyl*; 1995-2001.
"Post Products"; *Circle Industries*, Last updated: Feb. 17, 2003.
"Post Towers: Designed to Mount Vinyl Posts to Wood and Concrete Surfaces"; *Hover Fence Co.*; 1995-2001.
"Ranch Installation Instructions"; *A Vinyl Fence & Deck Wholesaler*; (date unknown).
"Invest in Carefree Outdoor Living (brochure and installation instructions)"; *Royal Crown Limited*; Aug. 2001.
"Vinyl Fence Installation Tips: Setting a Vinyl Post on a Conrete Surface"; *Hoover Fence Co.*; 2001.
"Vinyl Porch Posts: Installation Instructions for Vinyl Cladding"; *Hoover Fence Co.*; 1995-2001.
"Vinyl Railings Coming Soon!" Vinyl Solutions, Inc., available at http://web.archive.org/web/20020802145707/www.vinylfence.com/railings.htm, date unknown, 4 pages.

* cited by examiner

SYSTEM FOR SECURING A POST

RELATED APPLICATIONS

The present application is a continuation of prior pending U.S. patent application Ser. No. 10/426,442 filed Apr. 29, 2003 now U.S. Pat. No. 6,948,283, which claims the benefit of U.S. Provisional Patent Application Ser. No. 60/376,658 filed Apr. 29, 2002; each of these prior applications is fully incorporated therein by reference.

FIELD OF THE INVENTION

The present invention is directed to a post mounting system and method, and more particularly, is directed to a post mounting system having individually adjustable angled clamping members which contact the interior of a hollow plastic or composite post so as to hold such a post firmly against a base member's retaining wall surrounding such post.

BACKGROUND

Post retaining systems and methods are known in the art. For example, U.S. Pat. Nos. 5,404,682; Reissue No. 36,550; 5,458,428; 5,307,598; and 5,386,938, all to West, describe various devices for mounting posts, and in particular, hollow square vinyl posts, to secure the same. Difficulties exist, however, with respect to proper plumbing of such posts to ensure correct vertical alignment thereof and with respect to securing such posts in a stable fashion. Moreover, the method by which hollow vinyl posts are connected to a mounting assembly is often complicated and made difficult by the necessity of having various accessories required to perform such task. For example, in prior art post mounting systems and methods, a vice may be utilized to hold the post, a press is utilized to insert elements of the mounting assembly into the hollow interior of the post and a router rig is required to configure the interior and exterior portions of the post so that it can be properly configured for use with such prior art post mounting systems.

Figure 1:
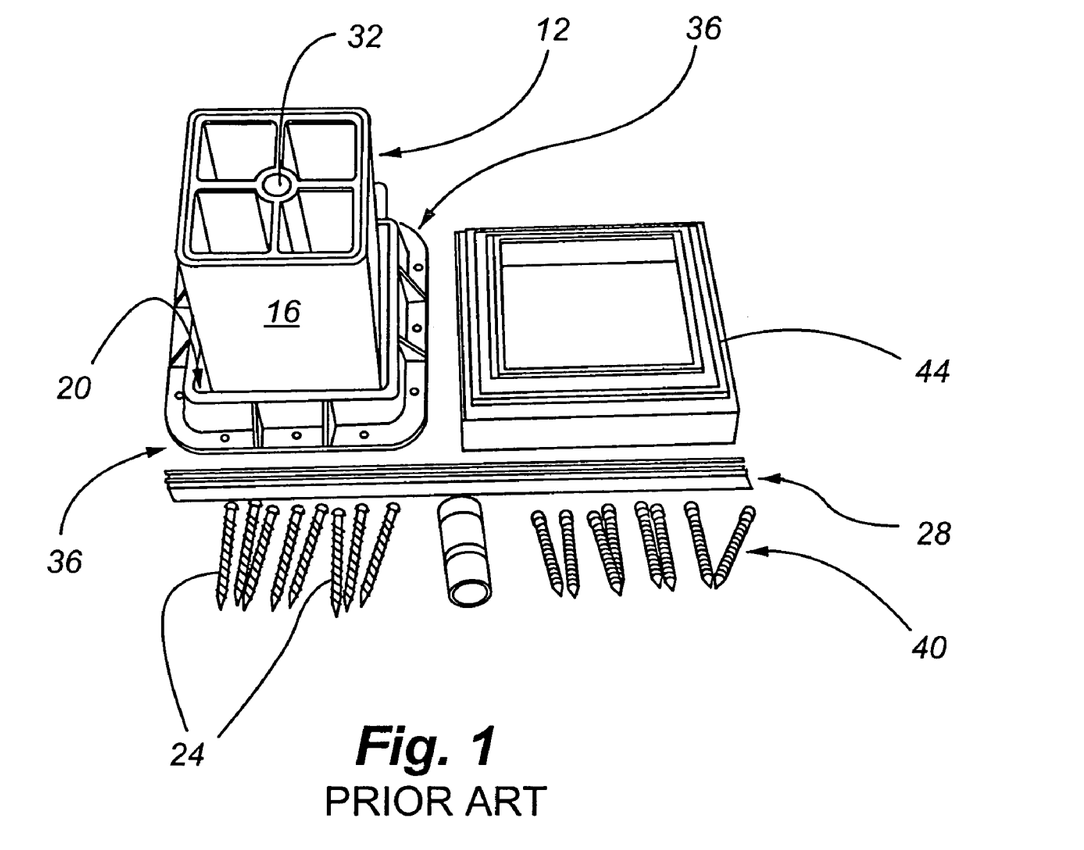
FIG. 1 is a representation of a prior art device for mounting a hollow vinyl fence post.

FIG. 1 is illustrative of the components used in other prior art mounting assemblies for securing hollow posts in a vertical position. Specifically, there is a support base 12 having: (a) a vertically protruding interior pedestal 16 over which a hollow post (not shown here) is fitted, and (b) a surrounding recess 20 into which a lower end of the hollow post is fitted when secured to the support base 12. The additional components shown in FIG. 1 include mounting screws 24 that can be used to secure support base 12 to a wood deck or porch, a threaded mounting rod 28 that can secure the support base 12 to the deck or porch by attaching the rod 28 to, e.g., an underneath side of the deck or porch so that the rod extends through the deck or porch and then through the center hole 32 of the support base. During assembly the following steps are generally performed: (a) the rod 28 is fastened with nuts and washers to the deck or porch, (b) a hollow post is selected that mates tightly with the pedestal 16 (the post interior is expanded if necessary), (c) the post is positioned on the pedestal 16, (d) the post is then vertically adjusted by various techniques such as: positioning shims underneath one or more of the four corners 36 of support base, reconfiguring the interior of the hollow post, and/or grinding the lower end of the post so that the post will be sufficiently vertical, (e) once the post is sufficiently vertical, screws 40 are threaded into the side of both the post and the support base 12 to secure the post to the support base, and (f) a trim ring 44 is provided over the exposed portion of the support base 12 to thereby cover the connection between the support base and the post.

To secure the hollow post tightly onto the support base 12, the interior pedestal 16 must tightly fit into the interior of the post. Accordingly, such pedestals 16 may be slightly larger than the interior of the post, and thus each pedestal must have its exterior dimensions reduced and/or each post must have its lower end interior dimensions increased so that: (a) the pedestal and its post tightly mate, and (b) when the support base 12 is secured to the ground (via the threaded bolts 24), the post will be (or at least appear to be) exactly vertical. Moreover, since the ends of such hollow posts may not be exactly perpendicular to the length of the post, a user can not always fully seat the lower end of the post into the recess 20. Additionally, the ground upon which the support base 12 is to be attached may not be (and typically is not) completely horizontally level. Thus, there is no simple way to assure that the length of the post will be vertical when put in position. Moreover, once the post is secured to the pedestal, there is no simple means by which the post's orientation to the support base 12 can be adjusted short of disengaging the two customizing their fit.

Thus, it would be desirable to have an efficient and sturdy system and method for securely attaching and more easily vertically aligning posts without the need for expensive accessories when performing post mounting operations.

SUMMARY OF THE INVENTION

The present invention is directed to a post mounting method and assembly wherein posts (and in particular, hollow posts) are more easily set in place. In particular, the present invention provides a method and assembly by which posts can be properly plumbed to a desired vertical orientation without undue expense or the need for expensive accessories in order to perform the post mounting operation.

Further description of advantages, benefits and patentable aspects of the present invention will become evident from the accompanying drawings and description hereinbelow. All novel aspects of the invention, whether mentioned explicitly in this Summary section or not, are considered subject matter for patent protection either singly or in combination with other aspects of the invention. Accordingly, such novel aspects of the present invention disclosed hereinbelow and/or in the drawings that may be omitted from, or less than fully described in, this Summary section are fully incorporated herein by reference into this Summary. In particular, all claims of the Claims section hereinbelow are fully incorporated herein by reference into this Summary section.

BRIEF DESCRIPTION OF THE DRAWINGS

FIGS. 3A-3C illustrate various views of the angled/wedge gripping element 118 to grip and properly align the vertical vinyl fence posts 126. In particular, referring to the vertically operative orientation (FIG. 2) of the gripping elements 118, FIG. 3A shows an end view of the gripping element 118, FIG. 3B shows a top view of the gripping element 118.

FIGS. 4A-4C illustrate views of one particular embodiment of a base member 112 designed to accommodate the angled/wedge gripping elements 118 and an end of a hollow vinyl fence post 126 therein. In particular, referring to the vertically operative orientation (FIG. 2) of the base member 112, FIG. 5A shows a side cross sectional view of the base member wherein the cross section is defined by the sectioning plane corresponding to the cross section viewing arrows A in FIG. 4B; FIG. 4B shows a top view of the base member 112.

FIG. 7 is shows an embodiment of the bottom (i.e., ground facing) side of the base member 112. In particular, this figure shows the threaded aperture/screw positions 154, wherein Allen headcap screws 158 are threaded therein. More specifically, each such Allen headcap screw 158 extends through the base member 112 and then extends through a threaded bore 160 of a corresponding one of the gripping elements 118 when the element 118 is operably positioned to rest against a face 116 of the angled support member 115 on the opposite (top) side of the base member 112.

DETAILED DESCRIPTION

For the purposes of sufficient enabling written description, the entire contents of U.S. Pat. Nos. 5,404,682; Reissue No. 36,550; 5,458,428; 5,307,598; and 5,386,938 are incorporated herein in their entireties by this reference.

Figure 2:
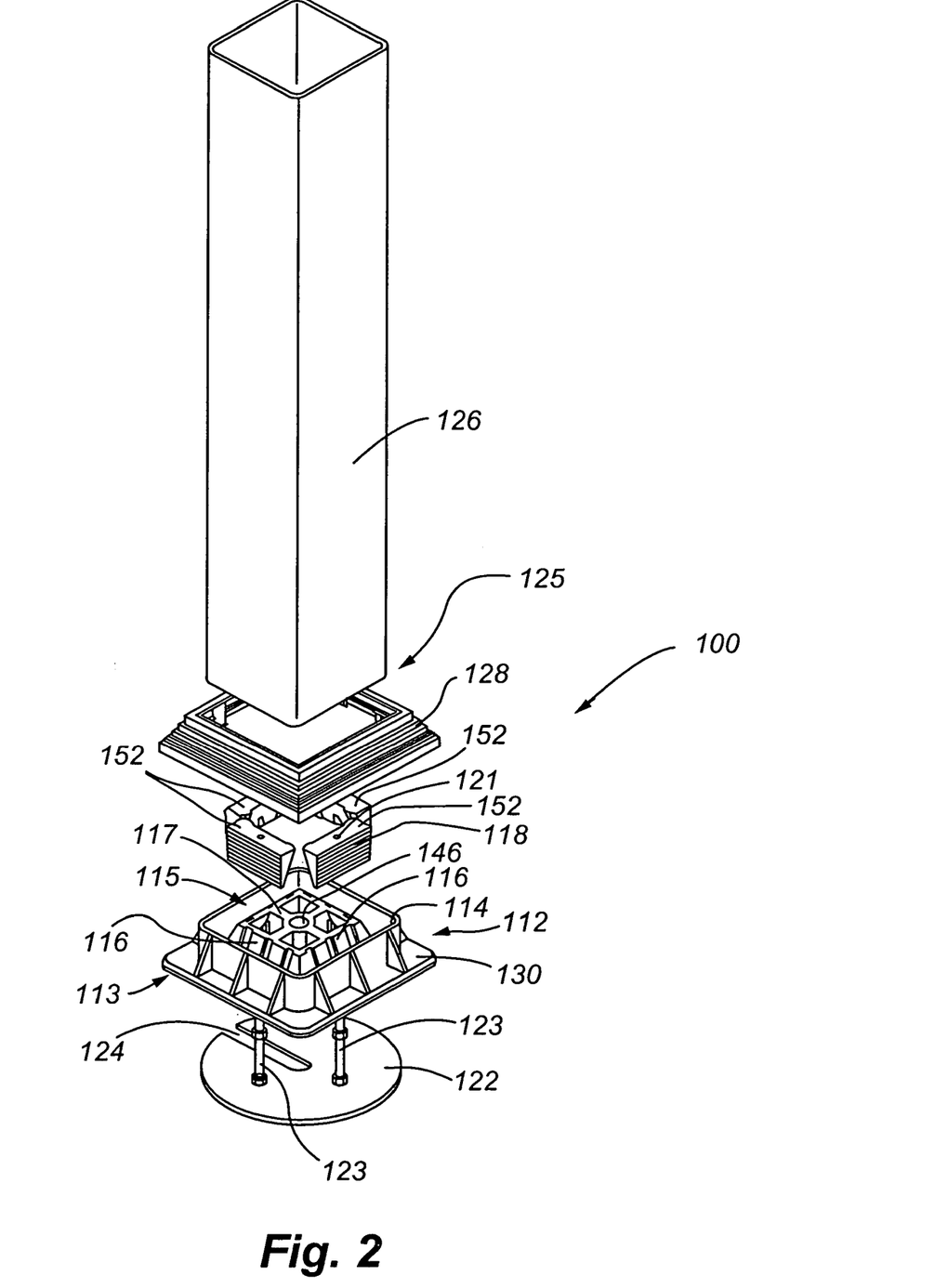
FIG. 2 is an exploded view of one embodiment of the present invention showing a shim plate 122, an angled support structure 115, four individual angled/wedge gripping element 118, a slide-over decorative cap 128 and a hollow post 126.
Figure 3A:
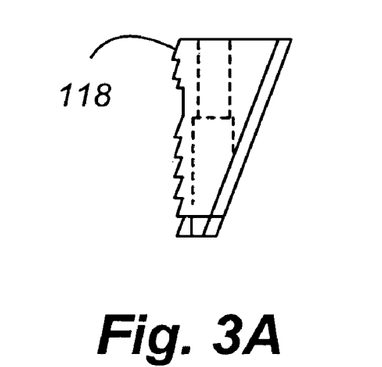
Figure 3B:
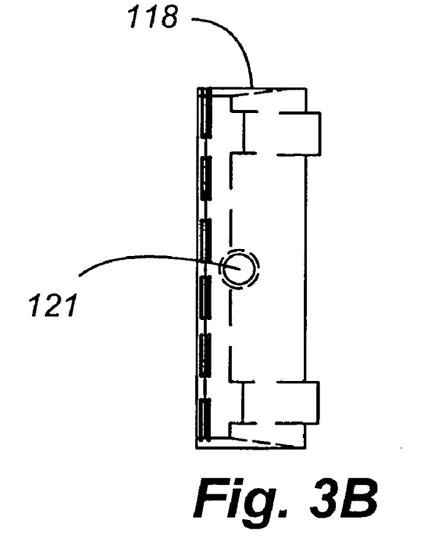
Figure 3C:
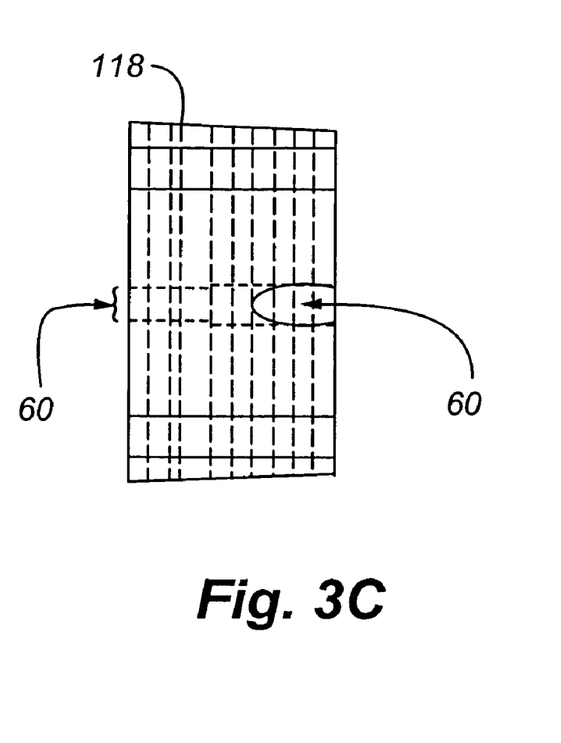
FIG. 3C shows a side view of the gripping element 118, wherein this side contacts a face 116 of an angled support member 115 (FIGS. 2 and 8).
Figure 11:
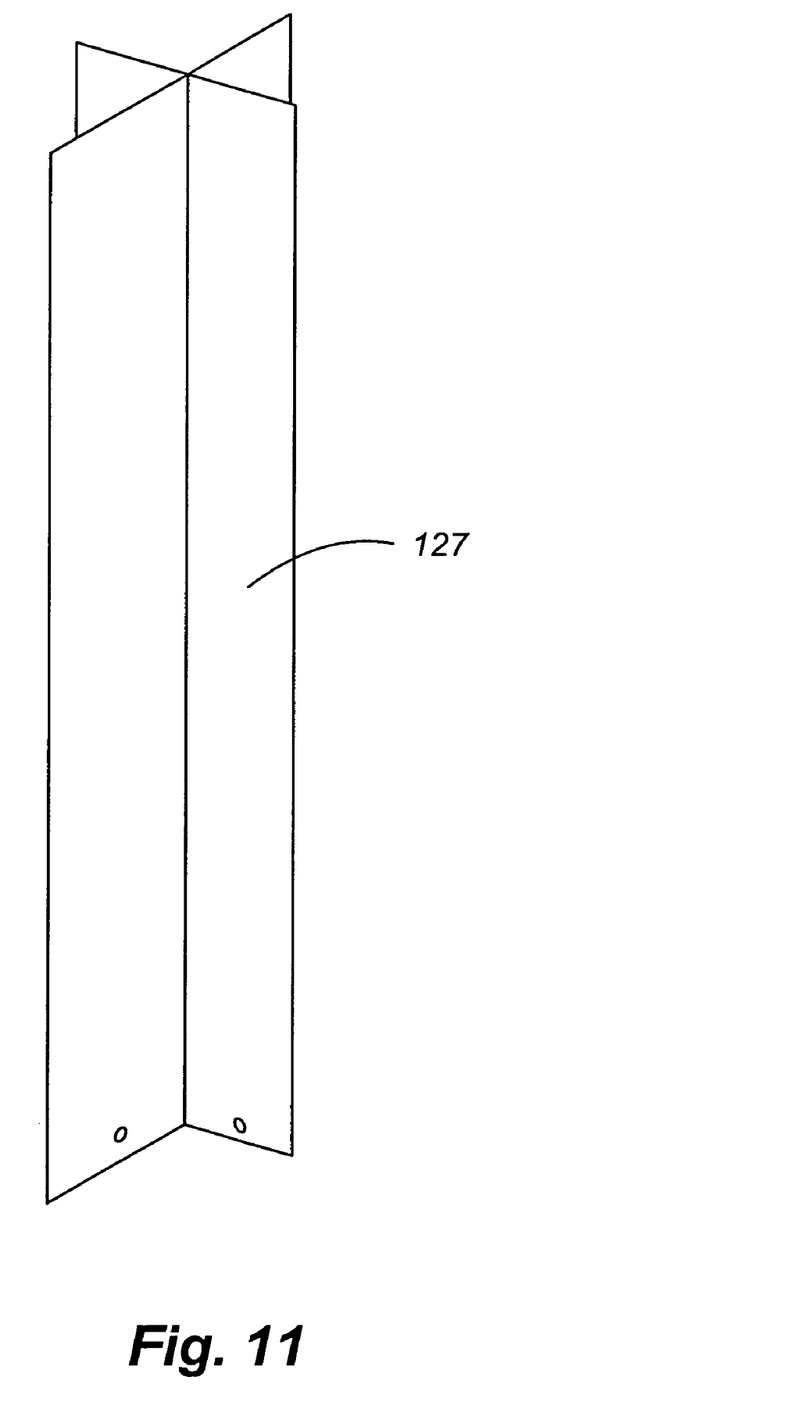
FIG. 11 shows one embodiment of an internal support member 127 that fits within a hollow post 126 to provide additional structural support therefor.

FIG. 2 shows one embodiment of the post mounting assembly 100 of the present invention. The post mounting assembly 100 includes a base member 112 for attaching to the lower end 125 of a hollow post 126 (this post being substantially identical to the post 26 of FIG. 1). The base member 112 includes a bottom plate 113 with an upper surface 130. Attached to the upper surface 130 is a substantially vertical wall component 114 configured to surround the exterior of the post lower end 125 when the post 126 is attached to the base member 112. The base member 112 also includes an angled support member 115 that has a truncated conical or pyramidal-shape with as many faces 116 as the hollow post 126 has. Note that although such a post 126 typically has four sides and may be manufactured from vinyl or a composite material (e.g., a wood flour polymer blend), it is within the scope of the invention for embodiments the assembly 100 to be configured to accept posts 126 having a smaller or larger number of sides. Indeed, there may be embodiments of the assembly 100 that are configured to accept cylindrical posts, such that there may be only a single conical face 116 circularly surrounding a top 117 of the angled support member 115. Moreover, such posts 126 may include reinforcing structures within their interiors that extend most of the lengths of the posts. Such reinforcing structures may be integral with the interior of the posts 126, or such reinforcing structures may be separate structures that are inserted into the interior of the posts prior to the posts being mounted to their base members 112. FIG. 11 shows one embodiment of such a reinforcing structure 127 for a post 126. In particular, when the reinforcing structure 127 is a separate unit that slides into the interior of a post 126, the reinforcing structure can be secured by suitable means, such as by attachment screws connecting the base member 112 to the attachment member 127, etc. Of course, other configurations of such reinforcing structures may also be used. However, such a reinforcing structure 127 must not interfere with or block the insertion of the angled support member 115 into the interior of a post 126. Accordingly, such a reinforcing structure 127 may be at least somewhat shorter than the interior of the post 126 in which the reinforcing structure resides so that when the reinforcing structure is positioned in the post interior (e.g., at a closed upper end of the post), the lower end 125 extends beyond the reinforcing structure a sufficient amount so that there is no blockage or interference with the insertion of the angled support member 115 into the lower end 125. Note that such reinforcing structures are important in various uses of fences and railings, e.g., that may be mounted on a second story of a dwelling. In particular, such posts 126 must satisfy certain safety code regulations, for example, at least withstand the force of a 500 lb. man leaning against the post without the post breaking, etc. Moreover in one embodiment, such a reinforcing structure 127 may be placed inside the post 126, via an open upper end of the post (which will subsequently be capped), after the post is connected to the base member 112 in a secure fashion.

In the embodiment of FIG. 2, the top 117 of the angled support member 115 square and has dimensions that are substantially smaller than the inside dimensions of the post lower end 125, and the faces 116 extend angularly downward from the top 117 to a post seating surface 120 (FIG. 4B), wherein this surface 120 has outer dimensions that are only slightly larger than the outer dimensions of the post lower end 125. In some embodiments, these outer dimensions are 0.02 inches to 0.025 inches larger than the outer dimensions of the post lower end, and in at least some embodiments approximately 0.15 inches larger. Additionally, the inner dimensions of the post seating surface 120 are smaller than the dimensions of the hollow interior of the post lower end 125, and in particular, these inner dimensions may be 0.275 inches to 0.300 inches smaller than the dimensions of the hollow interior of the post lower end.

In general, the top 117 will have substantially the same shape as a cross section of the interior of the post lower end 125 into which it fits. Thus, if this interior is circular, then the top 117 may have a substantially circular perimeter.

Figure 10:
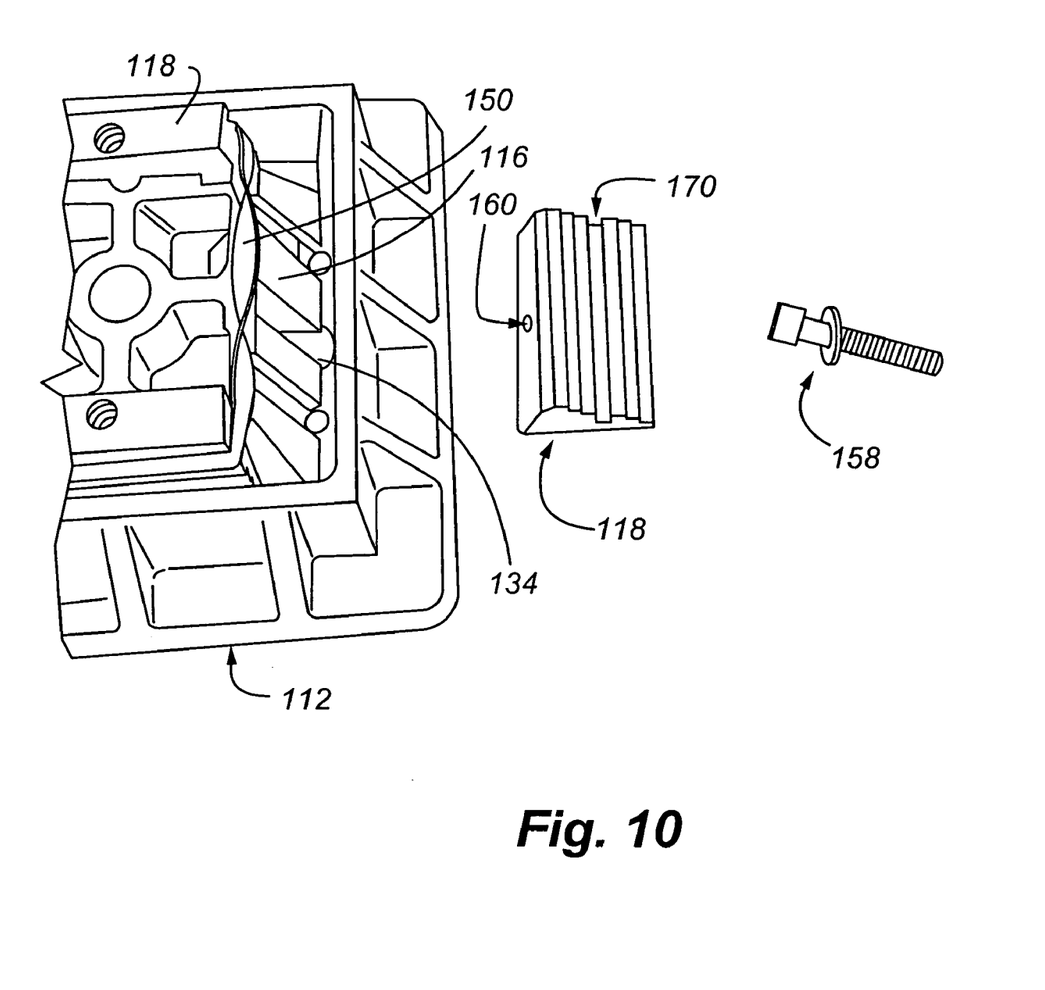
FIG. 10 shows: (a) a partial view of the base member 112 with its interior angled support member 115, (b) a gripping element 118 with its bore 160 running therethrough and a groove 170 running transversely to the bore, wherein the groove accommodates the elastic band or retaining member 150 (FIG. 6), and (c) a threaded bolt 158 for use in threadably securing the gripping elements 118 in the base member 112.

Each face 116 of the angled support structure 115 is configured to accept thereon a separate one of the angled/wedge gripping elements 118, each such gripping element having at least one bore 121 passing therethrough (in the orientations of the gripping element of FIG. 2, such bores are directed generally perpendicularly to the upper surface 130 of the bottom plate 113. Each of the bores 121 accepts an Allen headcap screw 158 (FIG. 10) that also is intended to extend through an oval bolt hole 134 (FIG. 4B) in the bottom plate 113 of the base member 112. Note that as the gripping elements 118 are forced toward the post seating surface 120 by tightening of the screws 158, the gripping elements move away from the center bore 146 and toward the interior surface of the post lower end 125. Thus, the oval configuration of the bolt holes 134 allows the screws 158 to remain substantially vertically oriented while such tightening causes them to move away from the center bore 146.

One or more circular shim members 122 each having a slot 124 provided therein are utilized beneath the base member 112 in order to adjust the angular orientation of the entire assembly 100 and (if attached) a post 126, thus permitting a method for adjusting the vertical orientation of the hollow post 126 once secured to the base member 112.

Figure 4A:
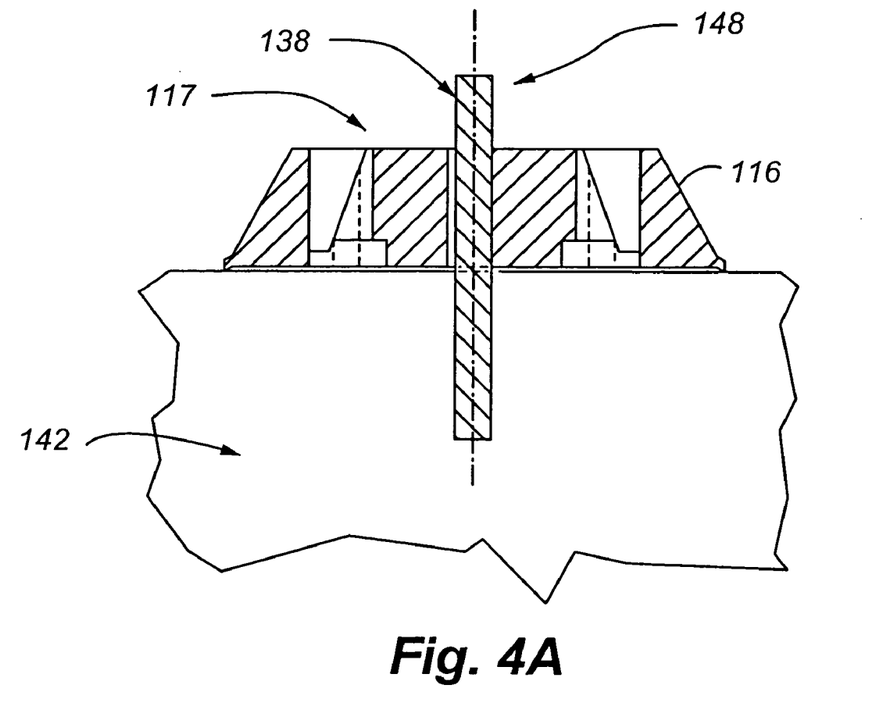
Figure 4B:
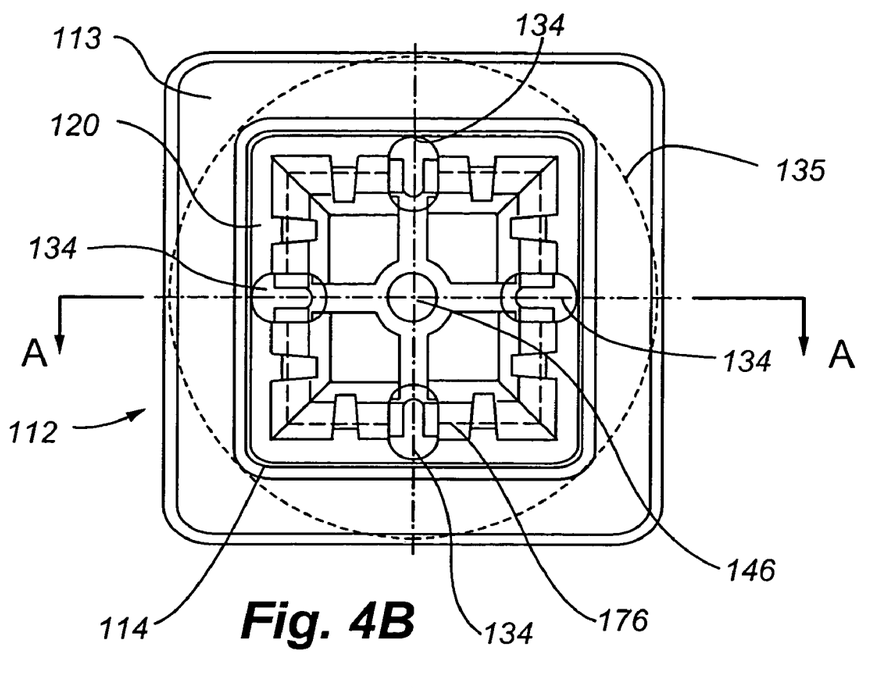
Figure 4C:
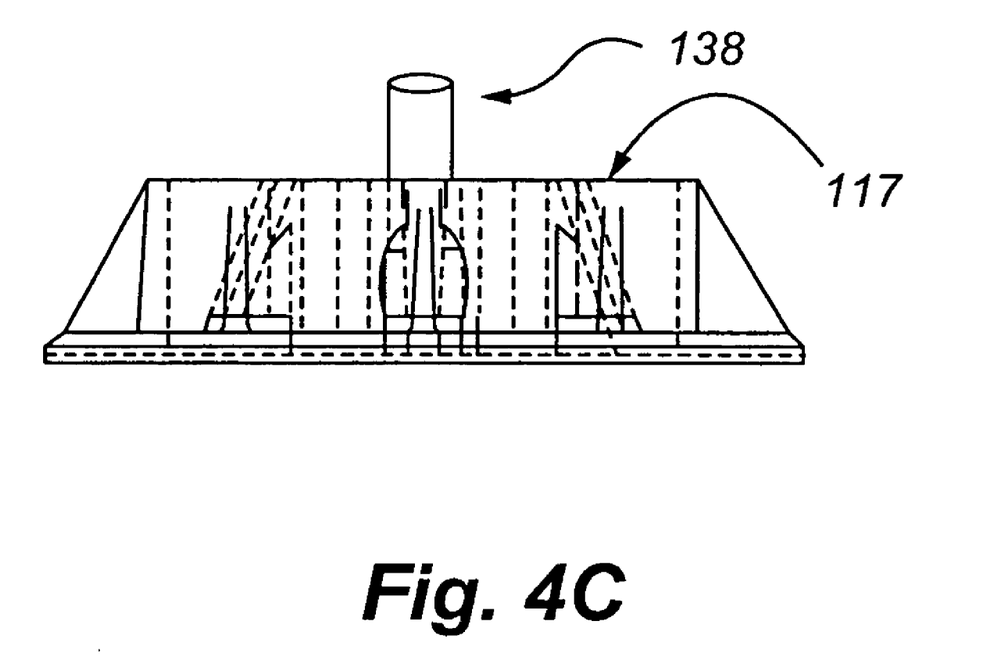
FIG. 4C shows an exterior side view of the base member 112.
Figure 5:
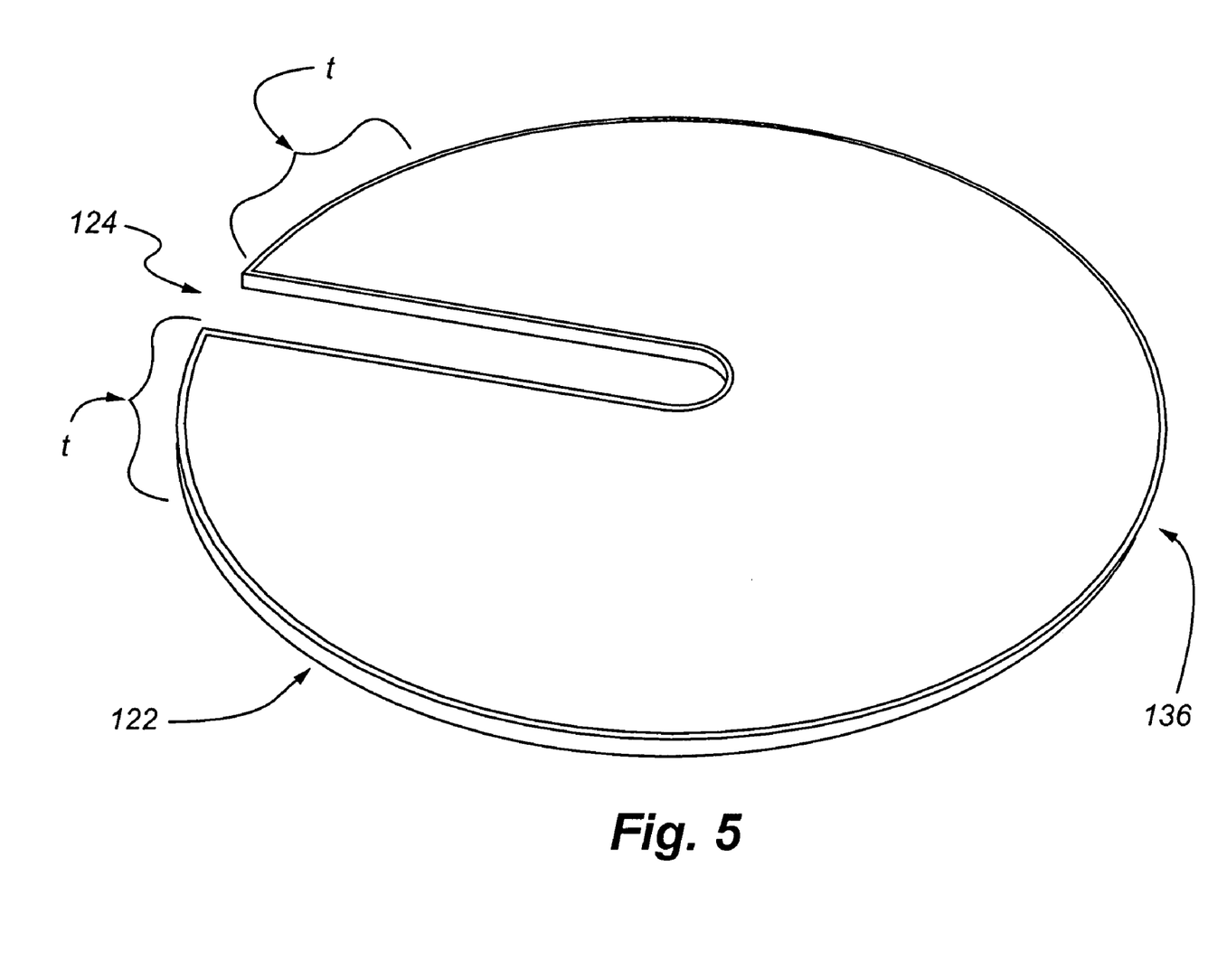
FIG. 5 is a representation of a shim member 122 suitable for use with the present invention, such a shim showing the thicker portion (t) at an area adjacent to a slot 124 formed therein.

Preferably, the shim member 122 has a circular shape, although any of various different shapes can be provided. Importantly, in a preferred embodiment, the shim member 122 is designed to substantially encompass the surface area below the base member 112, as opposed to prior art shims which merely raise a corner or portion of a side of a component that functions as a base member. The shims 122 therefore provide a broad "footprint" for support beneath essentially the entire base member 112. The slot 124 in the shim 122 provides for easy insertion beneath a base member 112 in order to change the angular orientation of the entire post mounting assembly 100. Preferably, the shim member 122 may be thicker around the slot 124 portion ("t" in FIG. 5) and is thinner at a portion 136 of the shim 122 directly across from the slot 124 opening. Additionally, the underside of the bottom plate 113 may have a recess or counterbore 135 (FIG. 4B) having a depth of approximately the thin portion 136 of a shim 122. Thus, the thicker portion, t, about the slot 124 allows access to the slot for rotating the shim about a projection or rod 138 (such as a threaded bolt, a lag screw or a threaded shaft extending out of, e.g., concrete) shown in FIGS. 4A and 4C while the post mounting assembly 100 is positioned for attachment to a support platform or structure. Note, in at least some embodiments, the support platform includes the rod 138 extending substantially vertically out of an in-ground concrete anchor 142 (FIG. 4A). That is, by utilizing a tool having a thin edge and a width of the edge no wider than the slot 124, such an edge may be placed in the slot for rotating the shim(s) 122 around the rod 138.

Figure 6:
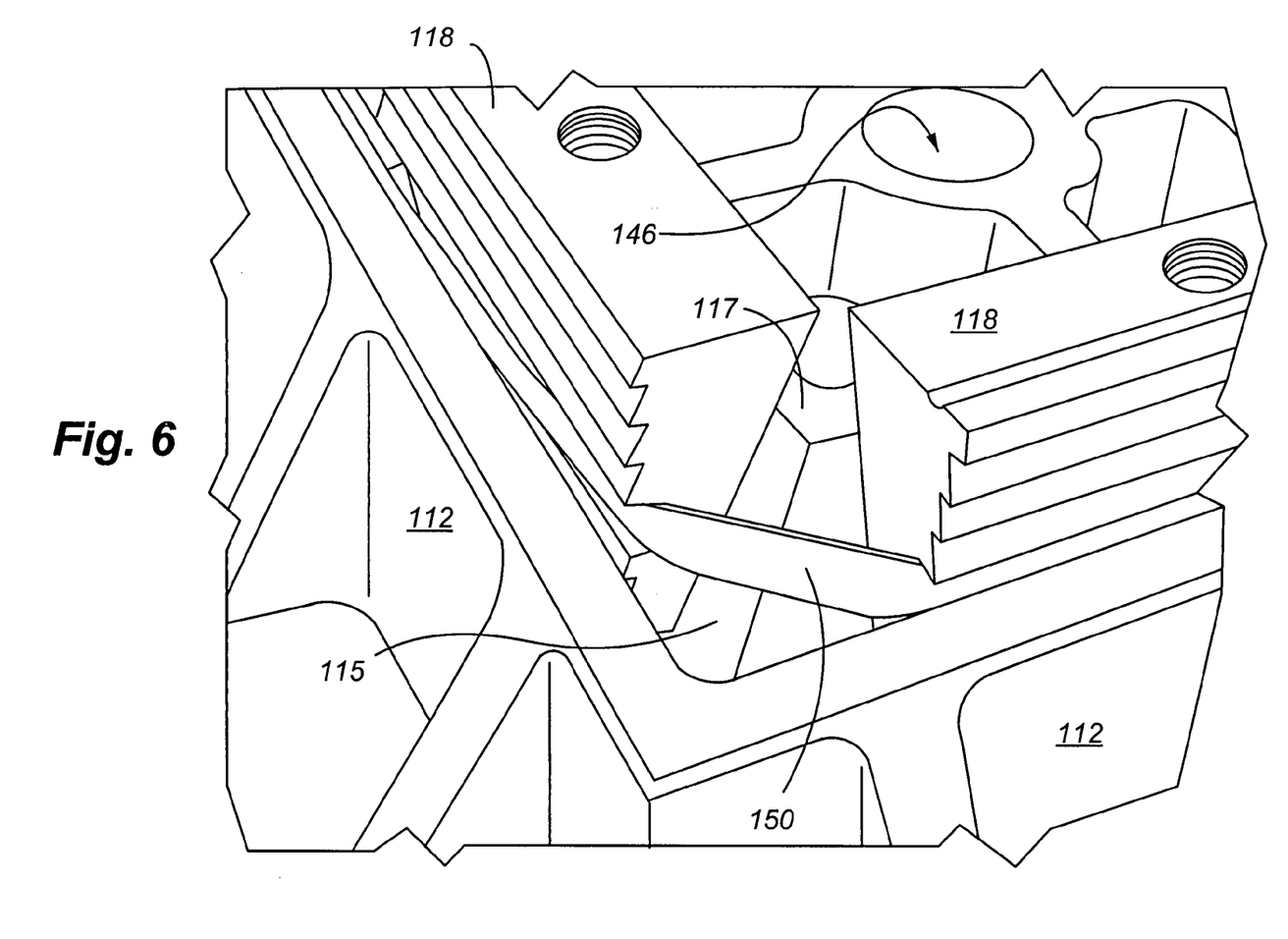
FIG. 6 is an illustration of one embodiment of the present invention where an elastic band 50 is provided that surrounds each gripping element 118 so as to maintain the gripping elements in a contacting position with an angled support member 115, thus allowing placement of a vinyl hollow post 126 (not shown) within the post mounting system of the present invention.

Although not shown, a plurality of such shims 122 can be stacked on top of each other (and underneath the base member 112) to achieve a desired angular orientation of the assembly 100. The shims 122 are preferably made from a durable material such as plastic, vinyl, metal, etc., as will be appreciated by one of ordinary skill in the art. Moreover, as shown in FIG. 6, each shim 122 has a thicker portion "t" that is substantially adjacent to the shim's slot 124. The thickness differences between the perimeter of the shim 122 adjacent the slot 124 opening and the perimeter of the shim substantially at t can vary. There may shims 122 that are effective for changing a substantially vertical orientation of a post 126 by, e.g., ¼ of an angular degree and/or multiples thereof. In some embodiments, where the shims 122 have a diameter of 6 inches, the thickness differences may be: (a) for a shim that changes the vertical orientation of a post 126 be ¼ of an angular degree, approximately 0.033 inches, and (b) for a shim that changes the vertical orientation of a post 126 be ½ of an angular degree, approximately 0.047 inches.

A decorative cap 128 is typically used to provide a desired ornamental appearance of the mounted post once the post 126 is securely positioned within the base member 112.

In operation, the post 126 is positioned within the base member 112 by abutting the walls of the post 126 against the exterior supporting wall 114 of the base member 112. The wedge members 118 are preferably held in contact with the pyramidal structure by an elastomeric retaining member 150. The individual gripping elements 118 are then tightened by an appropriate adjustment of the screw 123 provided through the gripping element's bore 121 so that the gripping element is pulled toward the post seating surface 120 of the base member 112. As each gripping element 118 moves toward the post seating surface 120, the gripping element also increasingly presses outwardly against the interior walls of the post 126. Once each of the individual gripping elements 118 is secured so as to tightly hold the walls of the post 126 against the exterior wall 114 of the base member 112, the post 126 will be securely mounted therein and cannot be removed unless the gripping elements 118 are loosened by operation of the threaded screws 123.

Figure 7:
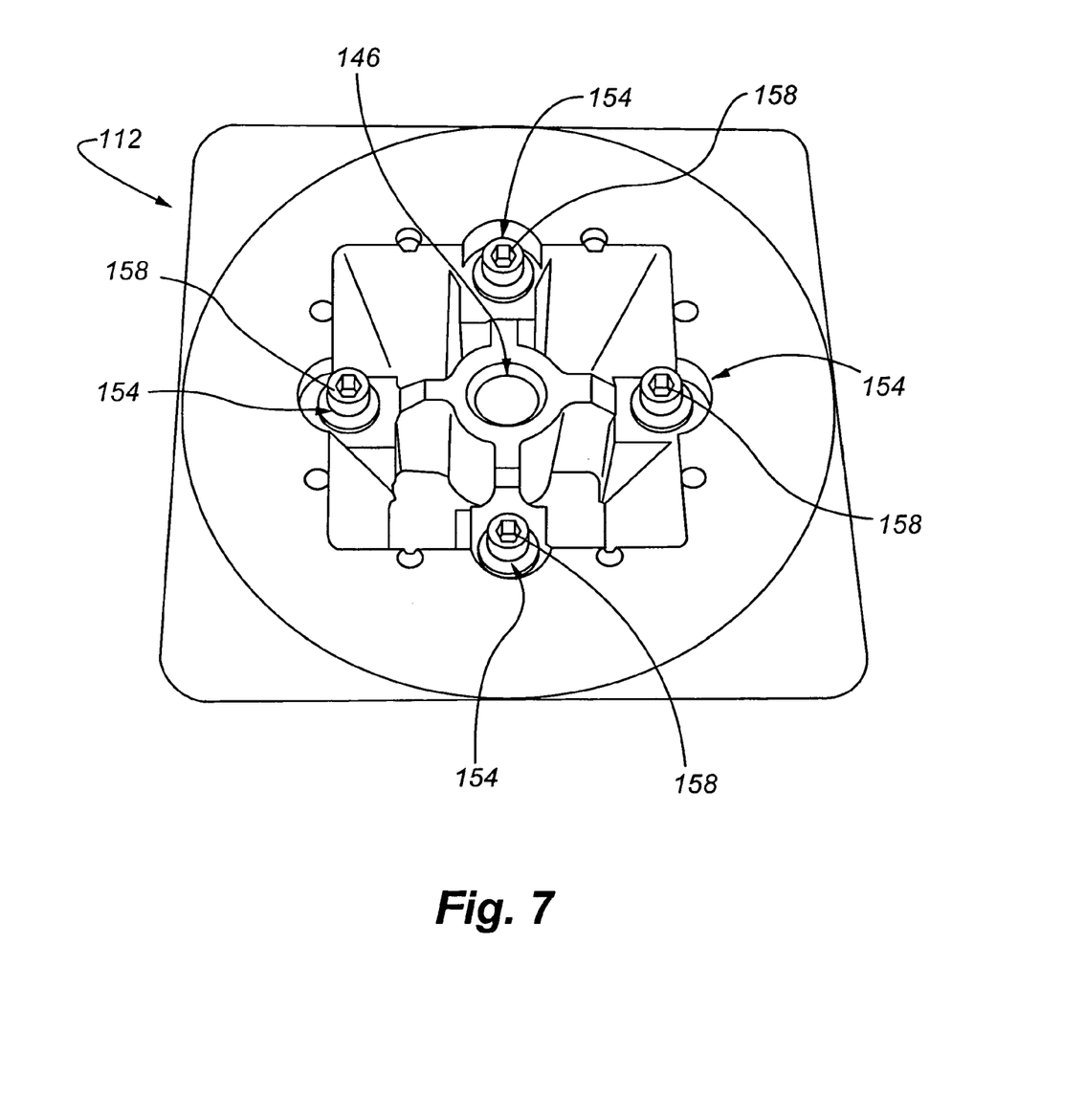
Figure 8:
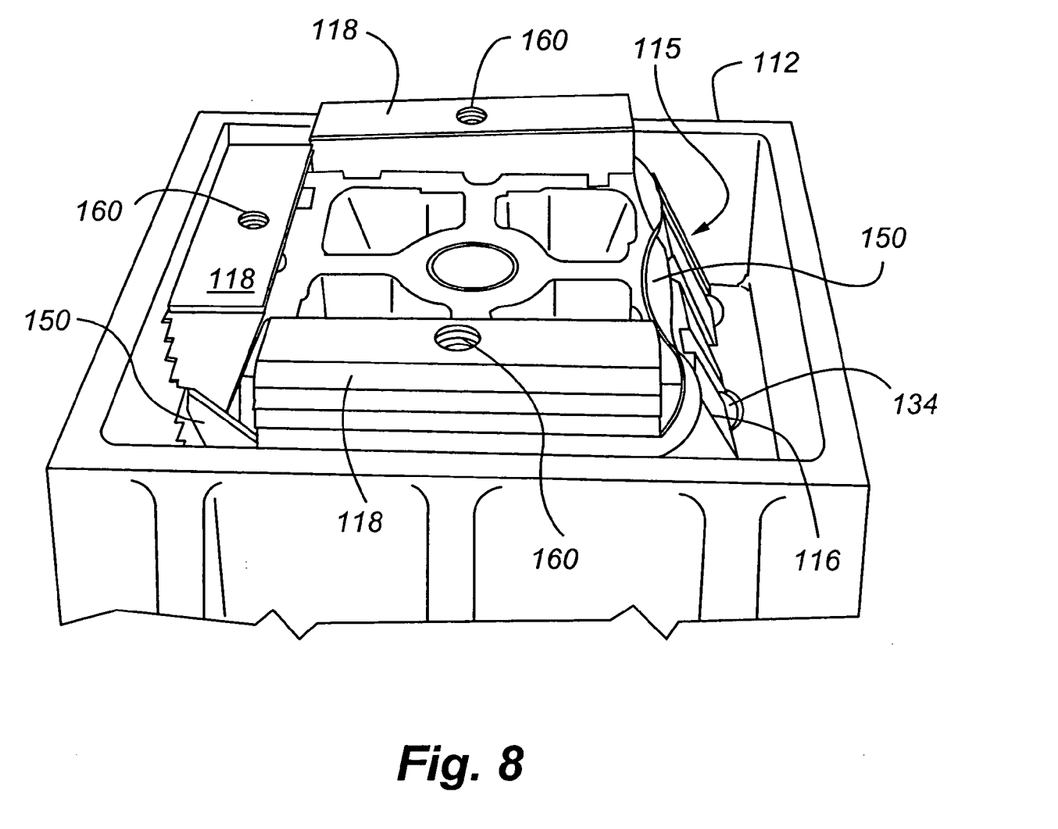
FIG. 8 illustrates a side perspective view of an embodiment of the present invention with three of four gripping elements 118 in their operative positions prior to the insertion of a hollow vinyl post 126.
Figure 9:
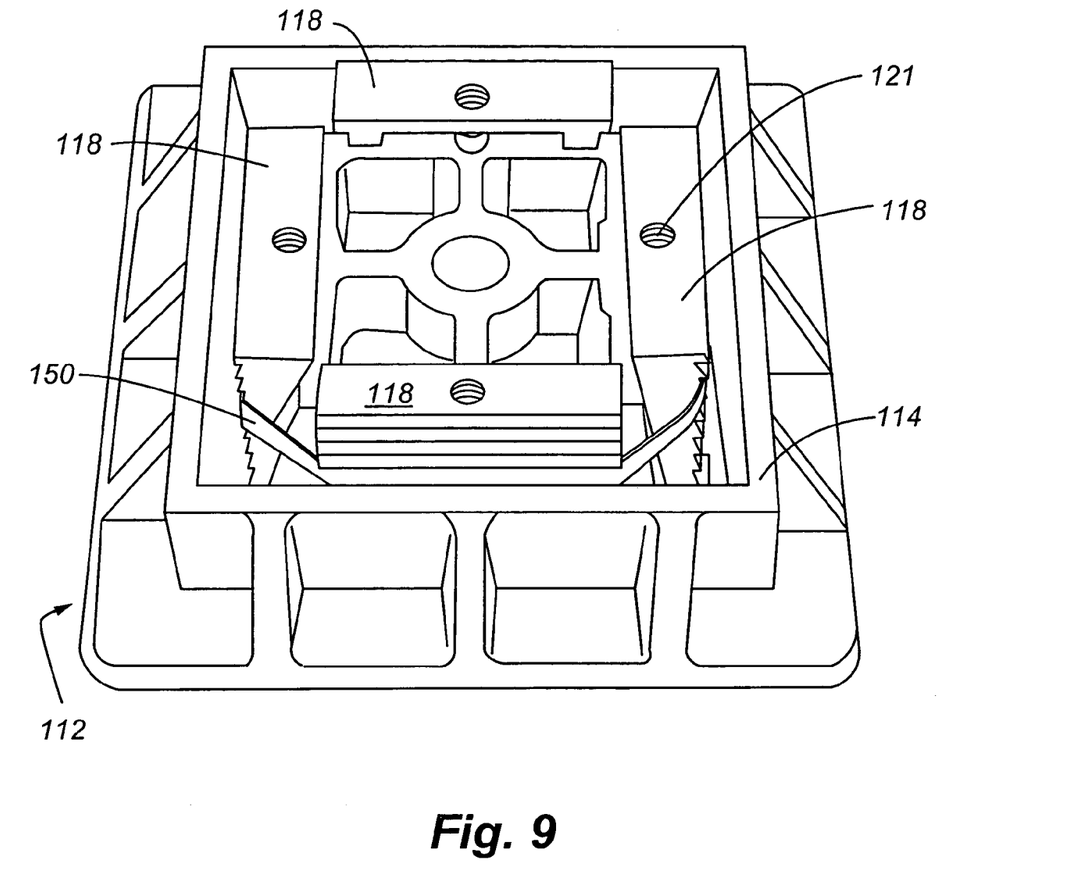
FIG. 9 is a perspective top view of one embodiment of the base member 112 with all the gripping elements 118 in their operative positions so as to accept a hollow post 126 (not shown in this figure) prior to tightening the Allen headcap screws 158 (not shown in this figure, but shown in FIGS. 7 and 10) on their threaded bolts 158 which, in turn, causes each of the gripping elements 118 to be forced downwardly and outwardly toward the interior walls of the hollow post 126 for securing the post to the base member 112.

Subsequently, a desired one or more shims 122, having various angular configurations (e.g., ¼°, ½°, ¾°, etc.) can be slid below the base member 112 so as to adjust the vertical angular orientation of the post mounting assembly 100—when it is mounted to a solid support such as the support platform described hereinabove. That is, once the rod 138 is inserted into the center bore 146 (FIGS. 2 and 7) of the base member 122 and the bottom surface of the bottom plate 113 is allowed rest upon the top surface of, e.g., the anchor 142 (or another anchoring support), a determination is made as to whether the post 126 attached to the base member 112 is sufficiently vertical. If so, then the base member 112 is secured to the anchor 142 by any one of a variety of techniques, e.g., including:

(i) tightening a threaded nut (not shown) onto a threaded upper end 148 of the rod 138 (FIG. 4A), wherein the rod may be, e.g., a shaft having an opposite end fixed in concrete, or a bolt with its head secured to the underside of a floor, walkway, bridge, etc.; note that the nut may be tightened onto the rod 138 via an opening (not shown) in the side of the post 126, wherein this opening is used to mount a railing into the post. Thus, the nut can be tightened onto the rod 138 after the post is secured by the gripping elements to the base member 112;

(ii) when the rod 138 is a lag screw, the opening for mounting a railing may be used as an access for tightening the lag screw down for securing the base member 112 to the support platform (such as wood or wood composite material);

(iii) bolting the base member 112 to the anchor 142 via bolt holes (not shown) in the bottom plate 113;

(iv) fixedly clamping the bottom plate 113 to the anchor 142 via clamps (not shown), wherein such clamps may be included as part of the support platform, and (v) inserting fasteners or spikes into holes (not shown) in the bottom plate 113 and driving these fasteners or spikes into the anchor 142.

However, if the post 126 attached to the base member 112 is not sufficiently vertical, then a determination is made as to the approximate direction and amount that the post 126 is angled from vertical, and one or more of the shims 122 are positioned underneath the bottom plate 113 (with the rod 138 inserted into the slot 124 of each of the shims and, if necessary, rotating the shims about the rod) to thereby orient the post 126 more vertical. Subsequently, another step of determining whether the post 126 is sufficiently vertical, and either the base member 112 is fixedly attached to the anchor 142 (if vertical alignment is sufficient), or further vertical alignment adjustments are made using one or shims 122. Accordingly, the above step of determining is iterated along with adjusting the post 126 vertical alignment until the post is sufficiently vertical and is then fixed to the anchor 142.

It should be understood that the above description is illustrative of how the assembly 100 may be utilized. Accordingly, instead of the base member 112 being attached to an in-ground anchor made of, e.g., concrete, the assembly 100 may be attached to a wooden foundation or another foundation material such as metal or brick.

In another embodiment of the invention, the angled support member 115 can be angled so that the wider portion of the support member is at the top 117, and faces 116 slope toward the center bore 146 as the faces come closer to the post seating surface 120. Thus, in this embodiment, gripping elements 118 are inverted within the post lower end 125, and the screws 158 (or, e.g., other threaded shafts) push (instead of pull) the gripping elements to engage the interior walls of a post 126.

In some embodiments of the invention, the Allen headcap screws 158 and their corresponding threaded portions within the bores 160 may be replaced by another mechanism for tightening the gripping elements 118 between the adjacent face 116 and the adjacent interior post wall. For example, spring activated levers (accessible via the underneath side of the bottom plate 113) attached to a non-threaded shaft extending through the bores 160 may be used wherein in an initial position such levers allow the gripping elements to fit loosely between the adjacent face 116 and the adjacent interior post wall, and in a second position cause the gripping elements to fit tightly and securely between the adjacent face 116 and the adjacent interior post wall. Thus, instead of the bores 160 being threaded, they are smooth and there is a hook or head on a portion of the shaft adjacent its bore 160 (e.g., an end of each shaft on the opposite side of the bore from that of the operably attached lever), so that when the lever is moved to its second position, the attached shaft mores the hook or head into contact with the operatively associated gripping element 118 for, in turn, urging the gripping element to securely wedge itself between its corresponding adjacent face 116 and its corresponding adjacent interior post wall.

Of course, other tightening mechanisms are also within the scope of the present invention, such as providing a plate (not shown) that rests, e.g., on the surfaces 152 (FIG. 2) of the gripping elements 118, wherein threaded bolts or screws may be tightened into, e.g., the base member 112 (via the railing opening discussed above) thereby forcing the plate toward the base member and consequently forcing the gripping elements 118 to secure the post 126 to the base member.

While various embodiments of the present invention have been described in detail, it will be apparent that further modifications and adaptations of the invention will occur to those skilled in the art. It is to be expressly understood that such modifications and adaptations are within the spirit and scope of the present invention.

What is claimed is:

1. A post mounting apparatus, comprising:

a base member for attaching to an end of a post, wherein the post end has an opening into an interior of the post, said interior having one or more interior walls;

wherein said base member includes:

(a1) a support member for inserting into the interior, said support member having one or more sides that slope relative to the interior walls of the post when the support member is provided in the interior, and (a2) a post receiving portion provided between a wall of the base member, and said support member, wherein when the post end is provided within said post receiving portion, said wall contacts an exterior of the post end;

one or more gripping members, each gripping member having a portion for providing in a corresponding position between one of the sides and one of the interior walls;

a tightening mechanism for securing the portion of at least one of the gripping members in the corresponding position;

wherein said tightening mechanism includes at least one part that is moveable between:

(b1) a first configuration, wherein the at least one gripping member is not secured to at least one of: any of the sides, and any of the interior post walls, and (b2) a second configuration, wherein the at least one gripping member is secured to both: one of the sides, and one of the interior post walls, wherein the at least one gripping member contributes to maintaining the post in a desired orientation.

2. The apparatus as set forth in claim 1, further comprising a shimming component for placing between said base member and a base member support for supporting said base member, said shimming component having an opening for receiving a projection projecting outwardly from the base member support, wherein said shimming component is rotatable about said projection for changing a vertical orientation of at least one of: said base member, and the post attached to said base member.

3. The apparatus of claim 2, wherein said shimming component has a first thickness and a different second thickness between a first surface of said shimming component facing said base member, and a second surface of said shimming component facing said base member support, wherein a change in a position of the first and second thicknesses between said base member and said base member support changes a vertical orientation of at least one of: said base member, and the post attached to said base member.

4. The apparatus of claim 1, further including a shimming component for placing between said base member and a base member support for supporting said base member, said shimming component having a first surface facing toward said base member such that said first surface has a perimeter that: (i) substantially encloses said wall of the base member, and (ii) is substantially between said base member the base member support.

5. The apparatus of claim 1, wherein said tightening mechanism includes a threaded bolt that threads through the at least one of gripping member.

6. The apparatus of claim 1, wherein said tightening mechanism includes a shaft and a lever, wherein said shaft contacts the at least one gripping member for moving the portion thereof from being: (i) unsecured to at least one of: all of the sides, and all of the interior post walls, and (ii) secured to both: one of the sides, and one of the interior post walls.

7. The apparatus of claim 1, wherein said at least one of said sides slope toward both the opening of the post and the interior walls of the post.

8. The apparatus of claim 1, further including a retaining member for exerting a retaining force on said at least one gripping member so that it is provided in a first orientation when the part of said tightening mechanism is in the first configuration, and wherein said retaining force is overcome when the part of said tightening mechanism transitions from the first configuration to the second configuration.

9. The apparatus of claim 1, wherein the at least one gripping member includes a bore therethrough for receiving a bolt or a shaft, said bolt or shaft operably attached to the at least one gripping member for moving the portion thereof between: (1) a position wherein the portion is not secured to at least one of: all of the sides, and all of the interior post walls, and (2) a position wherein the portion is secured to both of: at least one of the sides, and at least one of the interior post walls.

10. The apparatus of claim 1, wherein the portion of the at least one gripping member includes a wedge having a wide portion and a narrow portion, wherein in the corresponding position, the narrow portion is closer to the opening of the post.

11. The apparatus of claim 1, wherein in the second configuration, at least a portion of the post end is clamped between the at least one gripping member, and the wall of the base member.

12. A method for positioning a post, comprising:
providing a base member having:
(a1) a support member for inserting into an interior of a post, said support member having one or more sides for extending into the interior of the post, and
(a2) a post receiving portion provided between a wall of the base member, and said support member, wherein when the post is provided in said post receiving portion, said wall contacts an exterior of the post;
providing one or more gripping members, each said gripping member having a wedge for positioning in a corresponding position between one of the sides and a surface of the post interior;
providing a tightening mechanism for securing, for each gripping member, its wedge to both of: one of the sides, and the surface of the post interior;
wherein said tightening mechanism includes at least one part that is moveable between:
(b1) a first configuration, wherein at least one of the gripping members is not secured to at least one of: any of the sides, and any portion of the surface of the post interior, and
(b2) a second configuration, wherein the at least one gripping member is secured to both: one of the sides, and a portion of the surface of the interior, wherein the at least one gripping member contributes to maintaining the post in a desired orientation.

13. A method for positioning a post, comprising:
positioning one or more gripping members in a predetermined orientation relative to a base member; wherein:
(1) said base member includes (i) and (ii) following:
(i) a support member for inserting into an opening of a post having an interior, said support member having one or more sides, and
(ii) a post receiving portion provided between a wall offset from said support member, and the support member, wherein when the post is provided in said post receiving portion, said wall is substantially parallel to an exterior of the post;
(2) each of said gripping members includes a wedge with a narrower end and a wider end, such that said predetermined position positions said wedge between one of the sides and a surface of the post interior, wherein the narrower end is closer to the opening of the post;
connecting a securing mechanism to at least one of said gripping members for moving the at least one gripping member between its position in the predetermined orientation and a gripping position, wherein its wedge (W) securely contacts one of the sloping side, and the surface of the post interior;
wherein said securing mechanism includes at least a part that is moveable between:
(b1) a first configuration, wherein the wedge W is not secured to at least one of: any of the sides, and the surface of the post interior, and
(b2) a second configuration resulting in the wedge W being secured to both of: one of the sides, and the surface of the post interior;
inserting said support member and said gripping members into said post interior such that said opening enters said post receiving portion; and
moving a portion of said securing mechanism in a predetermined way so that said at least one gripping member moves to the gripping position.

14. The method of claim 13, further including placing a shim between said base member and a support for supporting said base member, said shim component having a slot for receiving a rod projecting outwardly from the support, wherein said shim is rotatable about said rod for changing a vertical orientation of at least one of: said base member, and the post attached to said base member.

15. The method of claim 13, further including:
providing a shim component having a first thickness and a different second thickness between a first surface of said shim component facing said base member, and a second surface of said shim component facing a support for said base member; and
changing a position of the first and second thicknesses between said base member and said support for changing a vertical orientation of at least one of: said base member, and the post attached to said base member;
wherein said first surface has a perimeter that: (i) substantially encloses said post receiving portion, and (ii) is substantially between said base member the support.

16. The method of claim 13, wherein in the second configuration, at least a portion of the post adjacent the opening is clamped between the at least one gripping member, and the wall of the base member.

* * * * *